United States Patent [19]

Flowerday

[11] Patent Number: 4,494,789
[45] Date of Patent: Jan. 22, 1985

[54] VISOR COVERING

[75] Inventor: Carl Flowerday, Holland, Mich.

[73] Assignee: Prince Corporation, Holland, Mich.

[21] Appl. No.: 490,363

[22] Filed: May 2, 1983

[51] Int. Cl.³ .............................................. B60J 3/00
[52] U.S. Cl. .................................... 296/97 H; 362/74
[58] Field of Search ............. 296/97 H, 97 R; 362/74, 362/140, 141; 5/468, 471

[56] References Cited

U.S. PATENT DOCUMENTS

| | | | |
|---|---|---|---|
| 3,751,106 | 8/1973 | Mahler et al. | 296/97 H |
| 3,827,748 | 8/1974 | Herr | 296/97 H |
| 4,203,149 | 5/1980 | Viertel et al. | 296/97 H |
| 4,411,467 | 10/1983 | Cziptschirsch | 296/97 H |

FOREIGN PATENT DOCUMENTS

| | | | |
|---|---|---|---|
| 58742 | 9/1982 | European Pat. Off. | 296/97 H |
| 2619844 | 4/1976 | Fed. Rep. of Germany . | |

*Primary Examiner*—Robert R. Song
*Attorney, Agent, or Firm*—Price, Heneveld, Huizenga & Cooper

[57] ABSTRACT

A visor includes a snap-in frame which extends inside a visor mirror receiving recess and engages its sidewalls compressing upholstery fabric against the walls and securely holding it in place. In one embodiment, the visor core is of clamshell construction in which the upholstery material is wrapped around the free edges and held in place around the peripheral boundary of the visor by the clamping action of the visor core. A method of manufacturing a visor of such construction includes the steps of surrounding a visor core having two halves with upholstery material and temporarily affixing the edges of the upholstery material around the free edges of the core, joining the core halves together to clamp the upholstery material in place around the periphery of the visor so formed while bonding the visor core halves permanently together to provide a compressive clamping force to the upholstery material. The method of the preferred embodiment of the invention pertaining to the visor recess includes the steps of cutting an opening through the visor upholstery material having a dimension slightly smaller than the dimensions of the visor recess and inserting the spring frame into the recess to compressibly hold the edges of the upholstery material in place.

20 Claims, 4 Drawing Figures

VISOR COVERING

BACKGROUND OF THE INVENTION

The present invention pertains to vehicle visors and particularly to method and apparatus for securing a covering to a visor core.

Visors employed on automobiles typically are made of a core covered by an upholstery fabric. Early visors have been made with a fiberboard-type core, and in recent years, molded polymeric cores of the type disclosed in U.S. Pat. No. 3,926,470 have been employed. Foam core construction is popular in European visors in which a solid foam material is employed to form the underlying body for the visor constructions. In such visors, to provide an attractive appearance, typically, the visor will be covered with an upholstery material colored and textured to match the interior upholstery of the vehicle.

In visors which include an illuminated vanity mirror package, as disclosed in the above identified U.S. Patent, it is necessary to bond the edge of the upholstery material where it is cut out to provide a trim appearing opening for receiving the lighted mirror package. In the past, this has been achieved by employing an adhesive material bonding the edge of the visor upholstery material to the polymeric core in the area surrounding the recess. Also, with some difficulty, the material has been ultrasonically welded around the recess. The mirror package also included a frame with a peripheral flange which overlies the upholstery material around the recess such that, when installed, the visor will have an overall neat and trim appearance.

Also, in prior visor constructions, typically, an edge trim bead has been employed around the periphery of the visor body and sewn in place. Recently, the edge bead has been eliminated and the edges of the fabric stitched through the edge of polypropylene core material or a thin cardboard edge piece has been stapled to the core and the material, in turn, stitched through the peripherally extended cardboard. Although this eliminates the need for the edge trim bead, stitching directly through the polymeric core is difficult and results in frequent fracturing of needles employed in the stitching equipment. The utilization of a cardboard strip fitted around the periphery of the visor eliminated this difficulty but added both manufacturing and material costs to the visor.

SUMMARY OF THE PRESENT INVENTION

The present invention overcomes the expense and difficulties encountered with the prior art upholstery methods and resultant visor construction according to one aspect of the invention by providing a snap-in ring or frame which extends within the visor mirror receiving recess and engages the sidewalls thereof, compressing upholstery fabric against the walls and securely holding it in place. This construction permits a frameless, lighted mirror package to be employed with the visor.

In another embodiment of the invention, the visor covering upholstery material is wrapped around the free edges of the clamshell core and held in place around the peripheral boundary of the visor with adhesive and by the clamping action of the visor core itself. In such construction, the visor core halves are bonded together with the upholstery material held in place.

The method of manufacturing a visor of such construction includes the steps of surrounding a visor core having two halves with upholstery material and affixing the edges of the upholstery material around the free edges of the core, joining the core halves together to clamp the upholstery material in place around the periphery of the visor so formed while bonding the visor core halves permanently together to provide a compressive clamping force to the upholstery material. The method of the preferred embodiment of the invention pertaining to the visor recess upholstery trimming method includes the steps of cutting an opening through the visor upholstery material having a dimension slightly smaller than the dimensions of the visor recess, and inserting a frame member having a dimension slightly larger than the dimension of the recess into the recess to compressibly hold the edges of the upholstery material in place.

These and other features, objects and advantages of the present invention will become apparent upon reading the following description thereof together with reference to the accompanying drawing figures in which:

DETAILED DESCRIPTION OF THE PREFERRED EMBODIMENT

Figure 1:
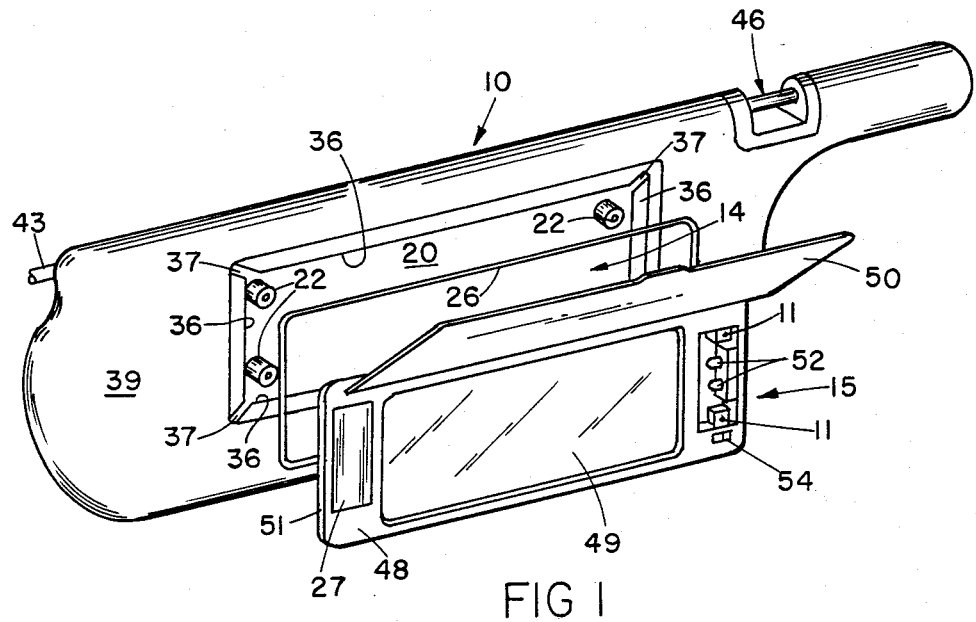
FIG. 1 is an exploded, perspective view of a visor construction embodying the present invention.
Figure 2:
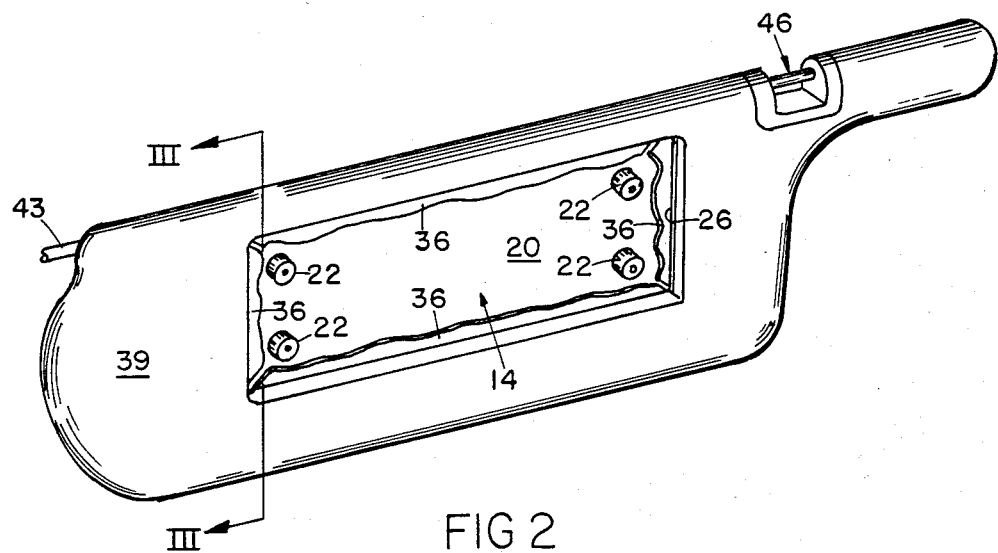
FIG. 2 is a fragmentary, perspective view of a visor embodying the present invention shown in a partially assembled position.
Figures 3, 4:
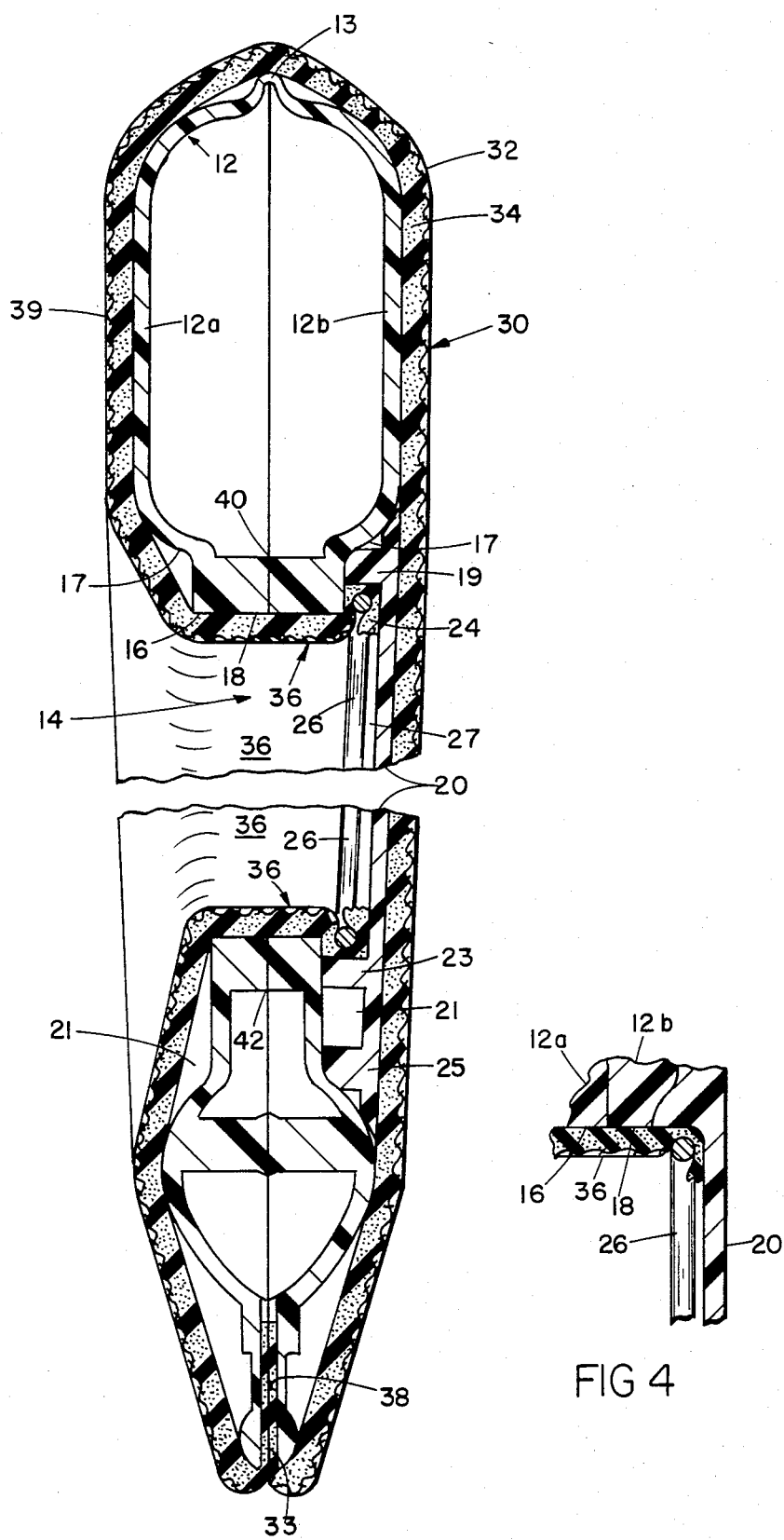
FIG. 3 is a greatly enlarged, cross-sectional view of the visor shown in FIG. 2 taken along section line III—III of FIG. 2.
FIG. 4 is an enlarged, fragmentary, cross-sectional view of an alternative embodiment of the present invention.

The visor 10 shown in the Figures is for the driver side of an automobile and includes a molded polymeric clamshell-type core 12 (FIG. 2) having a front half 12a and a symmetrical rear half 12b which, as will be described in greater detail below, are folded together, as shown in FIG. 3, and bonded during the manufacturing process. Halves 12a and 12b are integrally molded and joined along as a resilient linearly extending hinge 13 (FIG. 3). The core molded of a resilient polymeric material such as polypropylene includes a central, generally rectangular recess 14 extending through each core half for receiving a lighted mirror assembly 15 (FIG. 1). The opening 14 is bounded by a rectangular peripheral sidewall 16 formed in core half 12a and sidewall 18 in core half 12b. Thus, each core half will have a generally rectangular opening bounded by sidewalls extending in orthogonal relationship to the plane of the thin, elongated, rectangular visor core.

A separate panel 20, as best seen in FIG. 3, is attached to one of the visor halves 12a or 12b to provide a rear support wall. Due to the symmetrical construction of the visor core 12, panel 20 can be employed one either of the panels for providing the driver or passenger side visor. Thus, in the driver side visor, as shown in FIG. 1, panel 20 is positioned to enclose recess 14 by attaching the panel to core half 12b, typically by rivets. If the visor was to be used on the opposite side and therefore, reversed, the panel 20 would be secured to core half 12a to cover recess 14. Panel 20 includes forwardly extending bosses 22 (FIGS. 1 and 2) for receiving self-tapping mounting screws which secure the mirror assembly 15 within recess 14 of the visor.

As best seen in FIG. 3, core halves 12a and 12b form a top section above recess 14 with a substantially rounded, hollow, rectangular, cross-sectional shape and inwardly converging end walls to provide a concave corner area 17 into which an extension 19 of panel 20 fits for supporting the junction of panel 20 to the upper portion of visor core 12 while at the same time, defining a second recess 24 for receiving a spring wire frame 26 which is employed to secure the upholstered covering 30 of the visor within recess 14, as described in greater detail below. The lower portion of core 12 also includes an outer sidewall which is inwardly tapered to provide a concave corner 21 into which lands 23 and 25 of panel 20 extend for mounting the panel to the visor core. Extension 23 is spaced downwardly from the surface of wall 18 of the core half 12b to provide a continuation of recess 24 along the lower edge of recess 14. The second recess 24 also extends within the vertically extending sides of recess 14 and is defined by an extension 27 of wall 20 (FIG. 3). Core 12 also includes a recess (not shown) extending along the top edge for receiving a molded snap-in fitting 46 (FIG. 1) which can be secured to the core 12 by self-tapping screws or snapped in place and which cooperates with a socket in the vehicle to hold the visor in position releasably held against the forward portion of the vehicle headliner.

Surrounding the visor core is the upholstery material 30 which typically includes a vinyl or fabric outer sheet 32 integrally bonded to a polymeric foam backing material 34. The upholstery material is secured to the visor core and the visor assembled according to a method now described.

The upholstery material is initially die cut to a shape similar to the open shape of visor core 12 with excess material extending around the periphery of the core, folded over the peripheral edges of the core and bonded to the inside surface 38 (FIG. 3) by a bonding adhesive such as a hot melt glue. The upholstery material is placed on the core in smoothed but not stretched relationship and the material extending over the recess 14 is later cut away leaving flaps 36 of material extending inwardly over the edge of the recess, as best seen in FIG. 1. The corners can be diagonally slit, as shown at 37 in FIG. 1, to define separate upper, lower and side flaps.

With the upholstery material wrapped around the edge of the visor core 12, and secured around the inner peripheral surfaces 38 (FIG. 3), selected areas of the mating surfaces 40 and 42 of core halves 12a and 12b are heated by direct heating to melt the meltable polymeric material and the core halves closed around hinge point 13 and held shut while the surfaces 40 and 42 are still in a fused state thus clamping the overlying edges 33 of the upholstery material within the peripheral surfaces 38. The core halves 12a and 12b are held together with sufficient pressure and a sufficient time period to allow the polymeric material to cool providing a permanent fusion of the core halves 12a and 12b with the upholstery material securely held within the edge of the visor, as best illustrated in FIG. 3. The visor thus has a seamless frontal appearance around its peripheral edge (FIGS. 1 and 2) and no stitching is required through the extending edges 38 to secure the material thereto. A visor pivot rod assembly including a visor pivot rod 43 (FIG. 1) is fitted within a recess formed in core halves 12a and 12b for accommodating the same, as described in greater detail in co-pending U.S. patent application entitled VISOR CONTROL, Ser. No. 392,534, filed June 28, 1982, the disclosure of which is incorporated herein by reference.

The next step in the manufacturing process for the visor is to cut the opening over recess 14 and insert a generally rectangular wire frame 26 having a width and height slightly greater than that of rectangular recess 14 such that, once inserted, it will provide a compressive force against sidewalls 18. The flaps 36 of upholstery material are pushed inwardly and against sidewalls 16 and 18 of the core halves as the wire is inserted to compressibly hold the flaps 36 to the sidewalls of the recess and pull the upholstery material 30 tightly around the edges 17 and 21 to provide a curved, neat appearing boundary of the upholstery material about the rectangular recess 14. In the preferred embodiment of the invention, the wire frame 26 extends adjacent the rear wall 20 and fits within the recess 24 defined by the space between walls 18 and rear panel 20 and lands 19, 23 and 27. In the embodiment of FIG. 4, the extra recess 24 is eliminated and wire 26 compressibly holds the upholstery flaps 36 directly against sidewall 18 in the driver side visor, as shown, or against sidewall 16 for the reverse passenger side visor. In either construction, the spring wire framed 26 abuts the rear wall 20 and is positioned toward the rear of recess 14.

The lighted mirror package 15 can be of a construction similar to that disclosed in U.S. Pat. No. 3,926,470 but does not include a peripheral flange. Package 15 includes a rectangular mirror support 48 for a mirror 49. Secured to the support 48 is a cover 50 which pivots between an open position, shown in FIG. 1, and a snap-closed position by cover controlling bias means (not shown). On opposite sides of the mirror are lighting means including a pair of lamps 52 activated by a cover actuated switch to direct illumination outwardly from the side of the mirror 49 and converged toward the center of the mirror by lensed 27 placed over lamps 52. A bright/dim switch 54 is provided to control the intensity of illumination during use. With the visor body assembly completed, the mirror package 15 is inserted in recess and screws extend through the mounting bosses 11 of the mirror package and lenses 27 positioned thereover to complete the visor construction. The peripheral side edge 51 of support 48 extends into recess 14 with the front surface of support 48 flush with the front surface 39 of the visor. This construction provides a neat appearing, frameless design with the upholstery material abutting the sides 51 of support 48.

With the system of the present invention, the upholstery material, including flap 36, is tucked into and secured to the rear of recess 14 and held in place by a frame which compressibly holds the material against the sidewalls of the recess and adjacent the rear of the recess such that the frame 26 does not interfere with the actuating mechanism for cover 50. By providing an additional wire receiving recess 24 which extends behind the sidewalls of the recess 14 defined by the edges 16 and 18, the spring wire frame 26 can be completely concealed to provide additional clearance. In the preferred embodiment, frame 26 was made of wire having a diameter of about 3/32 inches which was formed into a rectangular frame and the free end butt welded. The upholstery material in the preferred embodiment of the invention overlapped peripheral edges 38 of the core halves 12a and 12b about ½ inch.

It will be come apparent to those skilled in the art that various modifications to the preferred embodiments of the present invention can be made without departing from the spirit or scope of the present invention as defined by the appended claims.

The embodiments of the invention in which an exclusive property or privilege is claimed are defined as follows:

1. A vehicle visor comprising:
   a visor body having a central recess formed therein through one side of said body, said recess enclosed at an opposite side of said body and including boundary wall means extending generally orthogonal to the plane of said visor body;
   upholstery material surrounding said visor body and including an edge portion extending into said recess to said enclosed side; and
   a frame member having a shape conforming to said recess and fitted within said recess adjacent said enclosed side to compressibly hold said edge portions of said upholstery against said boundary wall means of said recess, wherein said boundary wall means includes an additional recess adjacent said enclosed side of said first named recess for receiving said frame member.

2. The apparatus as defined in claim 1 wherein said frame member is a wire frame.

3. The apparatus as defined in claim 2 wherein said recess is generally rectangular.

4. The apparatus as defined in claim 3 and further including a covered illuminated mirror assembly positioned in said recess.

5. A vehicle visor comprising:
   a visor body of a molded resilient polymeric material including two core halves and having a central recess formed therein through one side of said body, said recess enclosed at an opposite side of said body and including boundary wall means extending generally orthogonal to the plane of said visor body;
   upholstery material surrounding said visor body and including first edge portion extending into said recess to said enclosed side and second edge portions wrapped around the peripheral edge of said core halves;
   a wire frame having a shape conforming to said recess and fitted within said recess adjacent said enclosed side to compressibly hold said edge portions of said upholstery against said boundary wall means of said recess; and
   means for securing said core halves together to compress said upholstery material around said periphery and hold said material in place.

6. The apparatus as defined in claim 5 wherein said core halves are integrally molded and joined along a molded edge defining a hinge between said core halves.

7. The apparatus as defined in claim 6 wherein said boundary wall means includes an additional recess adjacent said enclosed side of said first named recess for receiving said frame member.

8. The apparatus as defined in claim 7 wherein said recess is generally rectangular.

9. The apparatus as defined in claim 8 and further including a covered illuminated mirror assembly positioned in said recess.

10. The apparatus as defined in claim 9 wherein said means for securing said core halves together includes the provision of bonding surface means on each core half which mates with and is spaced from a corresponding bonding surface on the other core half such that when bonded together provide a compressive force to the upholstery matrial held between peripheral edges of said core halves.

11. The apparatus as defined in claim 10 wherein said securing means further comprises the fusion of said bonding surfaces together.

12. The apparatus as defined in claim 11 wherein said core halves are made of polypropylene.

13. A vehicle visor comprising:
   a visor body having a recess formed therein, said recess including boundary wall means extending generally orthogonal to the plane of said visor body;
   upholstery material surrounding said visor body and including an edge portion extending into said recess; and
   a spring frame member having a shape conforming to said recess and fitted within said recess to compressibly hold said edge portions of said upholstery against said boundary wall means of said recess.

14. The apparatus as defined in claim 13 wherein said frame member is a wire frame.

15. The apparatus as defined in claim 14 wherein said recess is generally rectangular.

16. The apparatus as defined in claim 15 wherein said boundary wall means includes an additional recess adjacent said enclosed side of said first named recess for receiving said frame member.

17. The apparatus as defined in claim 14 wherein said visor body is a molded resilient polymeric material including two core halves and wherein said upholstery material includes portions wrapped around the peripheral edge of said core halves and said apparatus further includes means for securing said core halves together to compress said upholstery material around said periphery and hold said material in place.

18. The apparatus as defined in claim 17 wherein said core halves are integrally molded and joined along a molded edge defining a hinge between said core halves.

19. The apparatus as defined in claim 18 wherein said means for securing said core halves together includes the provision of bonding surface means on each core half which mates with and is spaced from a corresponding bonding surface on the other core half such that when bonded together provide a compressive force to the upholstery material held between peripheral edges of said core halves.

20. The apparatus as defined in claim 19 wherein said securing means further comprises the fusion of said bonding surfaces together.

* * * * *